United States Patent
Ahmed et al.

(10) Patent No.: US 9,450,786 B2
(45) Date of Patent: Sep. 20, 2016

(54) LOW-COMPLEXITY METHOD FOR ESTIMATING IMPULSE-RADIO UWB WIRELESS CHANNELS

(71) Applicant: King Fahd University of Petroleum and Minerals, Dhahran (SA)

(72) Inventors: Syed Faraz Ahmed, Dhahran (SA); Tareq Yousuf Al-Naffouri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/227,390

(22) Filed: Mar. 27, 2014

(65) Prior Publication Data

US 2015/0280942 A1 Oct. 1, 2015

(51) Int. Cl.
H04L 25/02 (2006.01)

(52) U.S. Cl.
CPC ....... H04L 25/0256 (2013.01); H04L 25/0218 (2013.01)

(58) Field of Classification Search
USPC .......................... 375/130, 145, 142, 149, 150
See application file for complete search history.

(56) References Cited

U.S. PATENT DOCUMENTS

| | | | | |
|---|---|---|---|---|
| 2008/0212722 | A1* | 9/2008 | Heikkila | 375/341 |
| 2010/0195747 | A1* | 8/2010 | Agrawal et al. | 375/260 |
| 2012/0250806 | A1* | 10/2012 | Zhang et al. | 375/343 |

FOREIGN PATENT DOCUMENTS

| | | |
|---|---|---|
| WO | WO 2010/150198 A2 | 12/2010 |
| WO | WO 2012/040117 A1 | 3/2012 |

OTHER PUBLICATIONS

Huanan Yu, et al., "Compressed Sensing; Ultra-Wideband Channel Estimation Based on FIR Filtering Matrix", Ultra-Wideband—Current Status and Future Trends, Oct. 3, 2012, (20 pages).

Li, Y., "Channel Estimation and Signal Detection for UWB", Mitsubishi Electric Laboratories, Nov. 2003, (8 pages).

* cited by examiner

Primary Examiner — Kabir A Timory
(74) Attorney, Agent, or Firm — Oblon, McClelland, Maier & Neustadt, L.L.P.

(57) ABSTRACT

A Low-Complexity Minimum Mean Square Error (MMSE) method for estimation of impulse response or channel response of Impulse-Radio Ultra-Wideband (IR-UWB) wireless channels which exploits the sparsity of the received signal profile and the structure of the sensing matrix. The method comprises of first sub-sampling a received signal profile; second finding a minimum mean square error estimate of the impulse-radio ultra-wideband communication channel by Bayesian estimation according to priori channel statistics; and third identifying one or more substantially orthogonal clusters in the received signal profile. Impulse response of the impulse-radio ultra-wideband communication channel is the sum of the total number of resolvable multipath components, each with a real valued fading gain, and delay, relative to the arrival of the first path and impulse is the Dirac delta function.

12 Claims, 8 Drawing Sheets

Figure 1. Second order derivative of the Gaussian pulse, the typical pulse used in IR-UWB Communications Figure 2. Correlations of $100^{th}$, $300^{th}$ and $500^{th}$ columns with all the columns of
$\Psi$ Figure 3. Energy Capture based on the Channel Estimate Figure 4. Average Run Time Comparison Figure 5. Root Mean Square Error in Channel Estimation

Figure 7. A computer system upon which an embodiment of the present invention may be implemented

LOW-COMPLEXITY METHOD FOR ESTIMATING IMPULSE-RADIO UWB WIRELESS CHANNELS

BACKGROUND

1. Field of the Invention

The present disclosure relates to a channel estimation method of Impulse-Radio Ultra-Wideband (IR-UWB) wireless communications at the receiver.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ultra-wideband (UWB) radio is a rapidly evolving technology which is aimed primarily for indoor wireless communications and precision positioning applications. High achievable data rates and fine time resolution capabilities of UWB technology makes it attractive for wireless communications, networking, radar, imaging and positioning systems. In 2002, the U.S. Federal Communications Commission (FCC) allocated unlicensed spectrum for UWB communication, which resulted in an exponential growth of research in UWB technologies.

Several studies have addressed the channel estimation problem in UWB channels. Among these is maximum likelihood estimation of multi path components (MPCs) assuming very high rate sampling. Also, a pair of successive symbol-long segments is used for estimating the channel with one symbol acting as a dirty template for the other while the timing synchronization and estimation are performed by maximizing the correlation of the pair of successive symbol-long segments. The UWB channel has also been estimated using its Fourier coefficients. Compressive sensing is also applied for the UWB channel estimation problem by exploiting the channel sparsity. Among conventional estimation methods, none use a priori statistical information about the UWB channel and the rich structure of the sensing matrix.

UWB communications systems offer several advantages, including high data rates, high multipath resolution, low power requirements and simple transmitters. There are several challenges that accompany the advantages of UWB communication, however. The Nyquist sampling frequency for UWB signals is prohibitively high and is very difficult to realize using available analog-to-digital conversion technologies. Moreover, due to the huge bandwidth, a large number of multipath components (MPCs) are resolvable at the receiver and the transmitted energy is distributed over these MPCs. Since the transmitted energy levels in UWB systems are low (to minimize interference to other co-existing communications), the UWB receiver must estimate several MPCs to capture sufficient energy for successful communications. The channel estimation problem in UWB is therefore an important yet challenging task.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one aspect the present disclosure provides an efficient and low complexity method for estimating impulse response of an impulse-radio ultra-wideband communication channel which performs the following modules in consecutive order.

In another aspect the disclosure provides a low complexity channel estimation means for IR-UWB wireless channels.

In another aspect the disclosure provides improved RMSE performance over conventional channel etimation.

In another aspect the disclosure utilizes a priori statistical information of the channel and the rich structure of the sensing matrix to reduce computation complexity of channel estimation.

In another aspect the disclosure estimates channel impulse response for UWB communications with sub-Nyquist rate samples.

In another aspect a received signal profile is sub-sampled and second a minimum mean square error estimate of the impulse-radio ultra-wideband communication channel is found by Bayesian estimation according to a priori channel statistics.

In another aspect the disclosure provides one or more substantially orthogonal clusters in the received signal profile are found, whose inner products are below a certain value.

In another aspect the disclosure provides reducing MMSE estimate to cluster-wise calculations and calculating quantities of conditional probability and conditional expectation involved in the sum for estimating channel impulse response in an order-recursive manner.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

The description provided here is intended to enable any person skilled in the art to understand, make and use this invention. Various modifications to the disclosed embodiments will be readily apparent to those skilled in the art, and the general principals defined herein may be applied to these modified embodiments and applications without departing from the scope of this invention. In each of the embodiment, the various actions could be performed by program instruction running on one or more processors, by specialized circuitry or by a combination of both. Moreover, the invention can additionally be considered to be embodied, entirely or partially, within any form of computer readable carrier containing instructions that will cause the executing device to carry out the technique disclosed herein. The present invention is thus, not intended to be limited to the disclosed embodiments, rather it is be accorded the widest scope consistent with the principles and features disclosed herein.

Details of functions and configurations well known to a person skilled in this art are omitted to make the description of the present invention clear. The same drawing reference numerals will be understood to refer to the same elements throughout the drawings.

Although the description and discussion were in reference to certain exemplary embodiments of the present disclosure, numerous additions, modifications and variations will be readily apparent to those skilled in the art. The scope of the invention is given by the following claims, rather then the preceding description, and all additions, modifications, variations and equivalents that fall within the range of the stated claims are intended to be embraced therein.

The UWB signal is defined as a transmission with an instantaneous spectrum in excess of 500 MHz, or a fractional bandwidth (BW) of more than 20%. Impulse-Radio Ultra-wideband (IR-UWB) communications utilize low-duty cycle pulses to transmit data over a wireless channel. The large bandwidth allows the pulse duration to be very small, on the order of nanoseconds. By spreading the transmission power over the wide spectrum, UWB systems can operate with other existing communications systems, such as the IEEE 802.11 WLAN, IEEE 802.16 WiMAX and narrowband systems, in which the UWB signal appears as noise.

Figure 1:
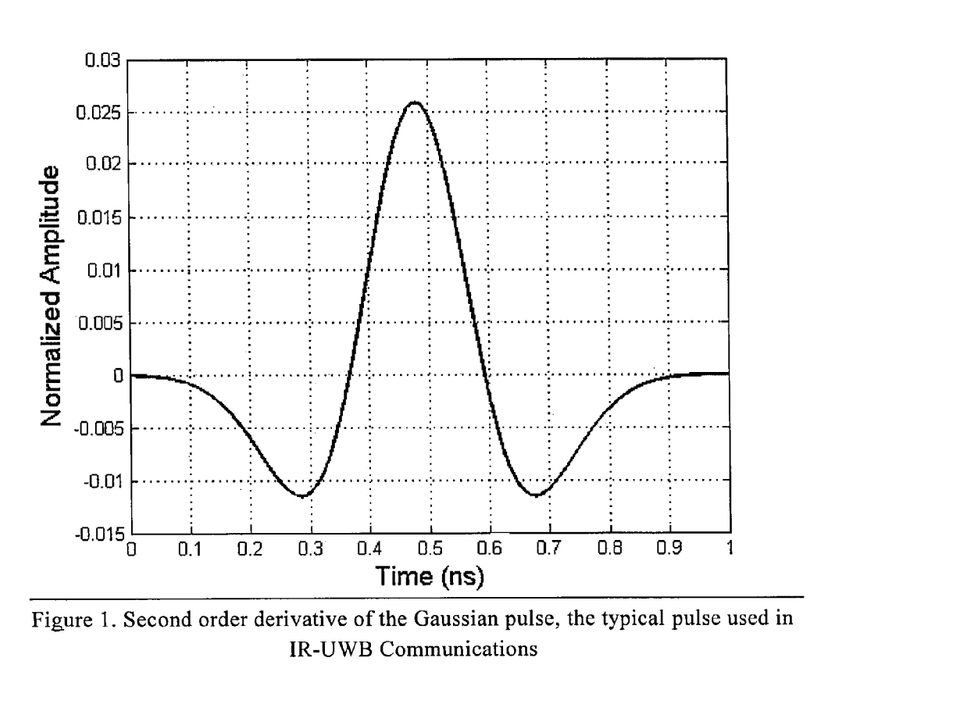
FIG. 1 shows the second order derivative of the Gaussian pulse, the typical pulse used in IR-UWB communications.

In an IR-UWB communications system, data are transmitted by sending very short duration, low-energy and low-duty cycle pulses. In this way, power is spread over the spectrum providing immunity against flat fading of the frequency. The baseband pulse used in IR-UWB communications is generally shaped as the second or the fifth derivative of the Gaussian function. The second derivative of the Gaussian pulse shape, shown in FIG. 1, is defined as, $$g(t) = \sqrt{\frac{4}{3\sigma\sqrt{\pi}}} \left(1 - \left(\frac{t}{\sigma}\right)^2\right) e^{-\frac{1}{2}\left(\frac{t}{\sigma}\right)^2}$$

The impulse response of the UWB channel can be expressed as, $$h(t) = \sum_{l=0}^{L-1} a_l \delta(t - \tau_l)$$

where L is the total number of resolvable MPCs, each $l^{th}$ path with a real valued fading gain, $a_l$, and delay, $\tau_l$, relative to the arrival of the first path and $\delta(t)$ is the Dirac delta function. Thus, the received signal profile, r(t), is given by $$r(t) = g(t) * h(t) = \sum_{l=0}^{L-1} a_l g(t - \tau_l) + \omega(t)$$

where g(t) is the transmitted pulse and * denotes linear convolution while $\omega(t)$ is the additive noise at the receiver, which is assumed to be white Gaussian.

The introduced channel can be represented in discrete time matrix-vector form, which lends itself to MMSE estimation. To this end, consider the received signal profile described by above which can be expressed in matrix form. r(t) can be represented using its Nyquist rate samples, $F_N$, taken every $$\Delta_N = \frac{1}{F_N}$$

seconds, which is much less than the pulse duration, $T_g$, and thus received signal can be written as $r(n\Delta_N) = \sum_{l=0}^{L-1} a_l g(n\Delta_N - m_l\Delta_N) + \omega(n\Delta_N)$ or, after dropping $\Delta_N$ for notational convenience, $$r(n) = \sum_{l=0}^{L-1} a_l g(n - m_l) + \omega(n)$$

Here it is assumed that the sampling interval, $\Delta_N$, is small enough such that the path delays can be represented as multiples of $\Delta_N$ i.e., $\tau_l = m_l \Delta_N$. The representation becomes more accurate as sampling interval is reduced. Since the Nyquist sampling rate for a typical UWB signal, having a 10 dB bandwidth of approximately 7.5 GHz., is prohibitively high, uniformly sub-sample the received signal, r(n), at a sub-Nyquist rate, $$F_S = \frac{1}{\mu} F_N,$$

where $$\mu = \frac{N}{M} > 1$$

while N and M represent the number of samples obtained at $F_N$ and $F_S$ sampling rates, respectively. The sub-sampled signal, y, at the receiver can be represented in matrix form as $$y = G\ a + \omega$$

Where, $$G = \begin{bmatrix} g[\mu(n)] & g[\mu(n-1)] & \ldots & g[\mu(n-N+1)] \\ g[\mu(n+1)] & g[\mu(n)] & \ldots & g[\mu(n-N+2)] \\ \vdots & \vdots & \ddots & \vdots \\ g[\mu(n+M-1)] & g[\mu(n+M-2)] & \ldots & g[\mu(n-N+M)] \end{bmatrix}$$

i.e., the columns of the matrix G are the discretized and shifted versions of the sub-sampled pulse, g (t).

The disclosure incorporates the a *priori* statistical information about the channel into the matrix model by absorbing the a *priori* statistical information into the channel matrix as $\Psi = GD$, where D is the matrix comprising of the second order statistics of the channel and thus the columns are weighed by the second order statistic of the corresponding channel tap. The matrix thus formed $\Psi$ is composed of columns that are closer to the contributions from the individual MPCs of the channel. Now, the received vector can be expressed as $$y=\Psi a+\omega$$

The optimal channel estimate, â, that minimizes the mean square error (MMSE), i.e. minimizes E ($\|a-\hat{a}\|_2$), a is given by $$E(a|y) = \sum_{J\subset N} p(J|y)E(a_J|y,J)$$

Where $a_J$ is the non-zero part of a corresponding to the support J (write $a=a_b \cdot a_J$, where $a_b$ is the binary support vector a and • is the element-by-element dot product operator) and N is the search space consisting of all the possible support sets. The MMSE estimate of the channel is, $$\hat{a} = \sum_{J\subset N} \frac{p(y|J)p(J)}{p(y)} E(a_J|y,J)$$

To find â, the following three terms need to be evaluated:
1) The *a priori* probability p(J);
2) The likelihood p(y|J);
3) The *a posteriori* expectation E(a|y,J).

The *a priori* pdf p(J); depends on the size of the support, |J|, (or equivalently the Hamming weight of the binary support vector $\|a_b\|_0$). Specifically, for |J|=k, the *a priori* pdf becomes $$\rho(J)=\rho_b^k(1-\rho_b)^{N-k}$$

Note that $\rho_b$ is the probability of the arrival of an MPC during the time bin of $\Delta_N$ seconds and can be computed from the model statistics.

It is difficult to evaluate E(a|y,J). Instead, the *a posteriori* expectation can be approximated by the least squares estimate. However, given the support J, the subsampled signal at the receiver denoted by y consists of a vector that lies in the subspace spanned by the columns of $\Psi_J$ plus an AWGN vector, ω. This implies that if y is projected onto the orthogonal complement of the subspace formed by the columns of $\Psi_J$, a Gaussian vector should be obtained due to the additive Gaussian noise. Mathematically speaking let $\Pi_{\Psi_J}(.)$ denote the projection matrix that projects onto the orthogonal complement space of $\Psi_J$.

The above analysis related to finding ways to calculate all the elements of the sum in calculating â. However the major challenge arises from the fact that the sum involved in finding the MMSE channel estimate consists of $2^N$ terms corresponding to the possible support sets. Furthermore, the complexity involved in computing p(y|J) and E(a_J|y,J) is relatively high due to the large size of the matrices and associated inverses involved in their calculations. In the following, it is described how the rich structure of the sensing matrix, Ψ, can be exploited to reduce the complexity in finding the MMSE estimate of the channel.

Specifically, it will be shown that the sum can be evaluated in a "divide and conquer" manner. Also, note that calculations can be done recursively and many of these calculations can be reused.

Figure 2:
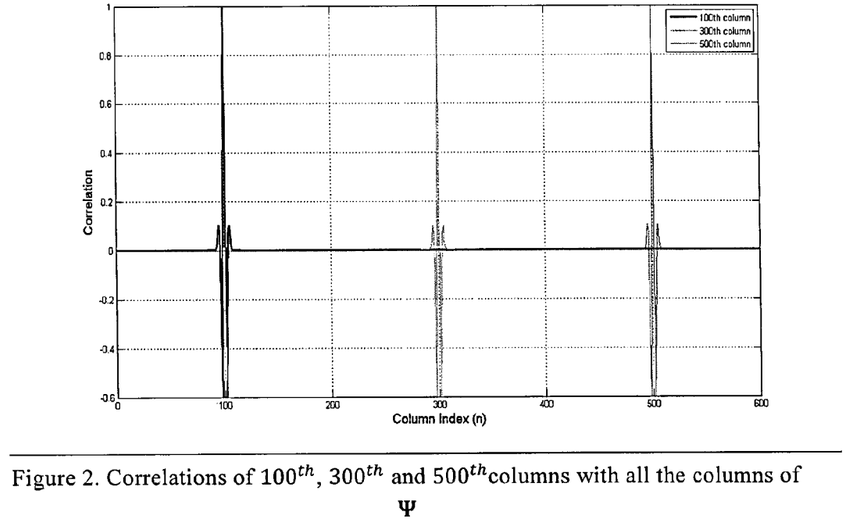
FIG. 2 shows the correlations of the 100-th, 300-th and 500-th columns with the remaining columns of the sensing matrix $\Psi$.
Figure 3:
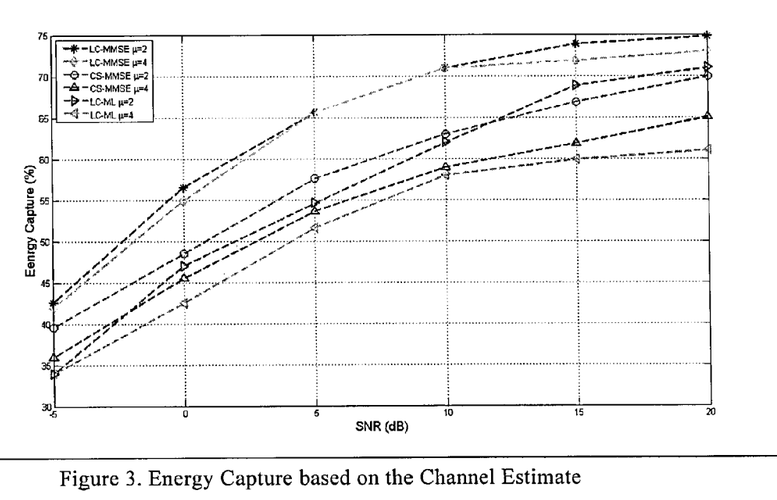
FIG. 3 shows the energy capture based on the channel estimate using the proposed method.
Figure 4:
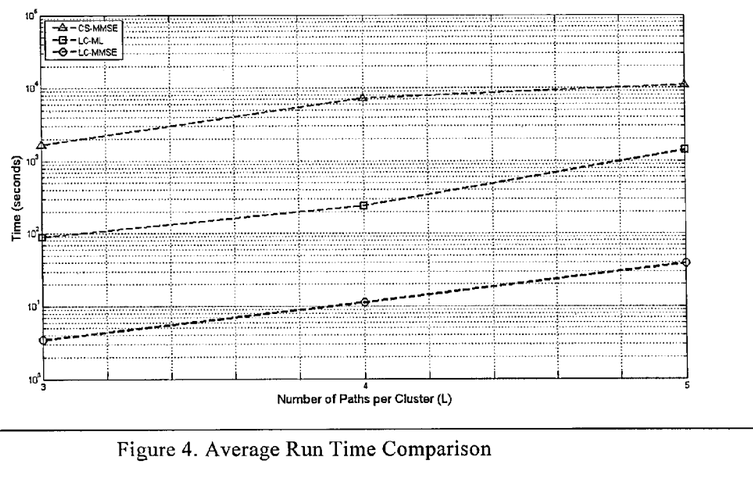
FIG. 4 shows the averaged run-time comparisons of the proposed methods with other methods.
Figure 5:
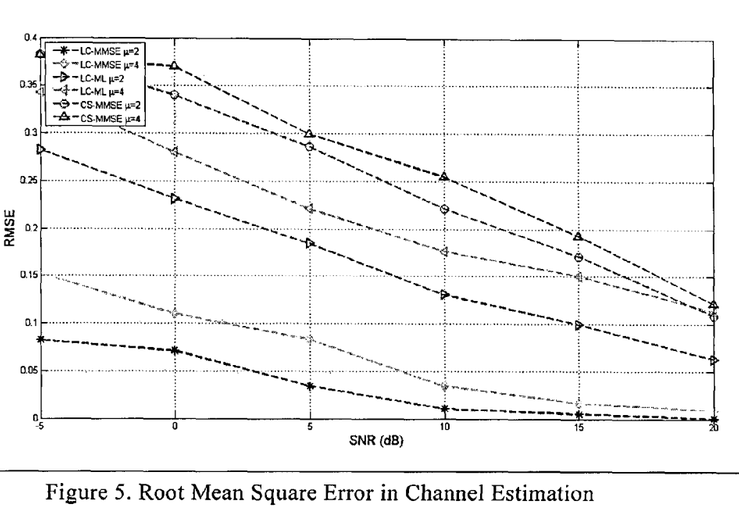
FIG. 5 shows the Root Mean Square Error in channel estimation.

The sensing matrix, Ψ, is not only Toeplitz but a banded diagonal matrix. A Toeplitz matrix is a matrix in which each descending diagonal from left to right is constant. The entries of a banded matrix are zero when the difference of row number and column number becomes more than a value. In a banded diagonal matrix, nonzero entries are in a band along the main diagonal. If the width of the basic pulse, g(n), at Nyquist rate sampling is denoted by $\bar{g}$ samples, then, for a given sub-sampling ratio μ, the bandwidth of the banded matrix, Ψ, is given by $\beta=\bar{g}\mu$. The banded structure of Ψ implies that:

$$\psi_i\psi_j=f(|i-j|) \text{ for } |i-j|\leq\beta$$

and $$\psi_i\psi_j=0 \text{ for } |i-j|>\beta,$$

where $\psi_i$ is the $i^{th}$ column of Ψ and f(.) is some correlation function. Thus, the columns that are separated by more than β are orthogonal to each other, as illustrated in FIG. 2. Therefore consecutive columns of Ψ can be grouped to form a number of nearly orthogonal clusters. Here two columns are assumed to be nearly orthogonal when their inner product is below a small scalar, say 0.01, where the columns are of unit norm. Since these clusters are mutually nearly orthogonal, this technique is referred to as orthogonal clustering (OC). It follows that the MMSE estimate can be calculated as follows:

$$\hat{a} = \sum_{J_C\subset \cup_{c=1}^{C}\theta_c} p(J_C|y)E(a_{J_c}|y) = [\hat{a}_1 \quad \hat{a}_2 \quad \ldots \quad \ldots \quad \hat{a}_C]^T$$

Where $J_c$ is the support in the $c^{th}$ orthogonal cluster, $\theta_c$, and $\hat{a}_c$ is the portion of the channel vector â corresponding to the $c^{th}$ orthogonal cluster. In summary, by identifying C nearly orthogonal clusters ($\theta_1, \theta_2 \ldots \theta_c$) in the received profile all calculations involved in finding the MMSE estimate of the channel can be divided into a set of independent calculations. Furthermore, since only a few of these clusters are active, begin by correlating y with each cluster $\theta_c$ and limit the above calculations only to those clusters that have significant correlation.

The following shows how the structure of the sensing matrix, Ψ, can be further exploited to reduce the computations for a given cluster, i.e., to reduce the calculations involved in calculating $\hat{a}_c$ itself.

Having reduced the MMSE estimate to cluster-wise calculations, to present how the two quantities involved in this sum, p(y|J) and E(a_J|y,J), can be calculated in an order-recursive manner note first that expressions for these two quantities are strongly related as can be seen from the fact that:

$$-2N_0 \ln p(y|J)=\|\Pi_{\Psi_J}y\|_2^2=\|y\|_2^2-y^H\Psi_J[\Psi_J^H\Psi_J]^{-1}\Psi_J^H y=\|y\|_2^2-y^H\Psi_J E(a|y,J)$$

As such, recursive implementation of the algorithm in the disclosure depends on the recursive implementation of E(a|y,J).

Consider the general support J={$i_1, i_2, i_3, \ldots, i_k$} with $i_1<i_2<\ldots<i_k$ and let $\underline{J}$ and $\overline{J}$ denote respectively the following subset and superset:

$$\underline{J}=\{i_1,i_2,i_3,\ldots,i_{k-1}\}$$

$$\overline{J}=\{i_1,i_2,i_3,\ldots,i_{k-1}\}$$

Where $i_k<i_{k+1}$.

The following is a summary on how to update $e_{y,k-1}(\underline{J}) \triangleq E(a_j|y)$ to obtain $e_{y,k}(J) \triangleq E(a_j|y)$:

$$e_{y,k}(J) = \begin{bmatrix} \frac{1}{f_J}(q^H_{\psi,k}(J)e_{y,k-1}(\underline{J}) - \chi_{ik}e_{y,1}(i_k))e_{\psi,k}(J) + e_{y,k-1}(\underline{J}) \\ \frac{1}{f_J}(q^H_{\psi,k}(J)e_{y,k-1}(\underline{J}) - \chi_{ik}e_{y,1}(i_k)) \end{bmatrix}$$

Where k is the order of recursion and define the following terms:

$q_{\psi,k}(J) \triangleq \Psi^H_J \psi_{ik}$ $e_{\psi,k}(J) \triangleq \Psi_J[\Psi^H_J \Psi_J]^{-1}\Psi^H_J \psi_{ik}$ $q_{y,1}(i_k) \triangleq \Psi^H_{ik} y$ $f_J \triangleq \chi_{ik} - q^H_{\psi,k}(J)e_{\psi,k}(J)$ $\chi_{ik} = \|\Psi_{ik}\|^2_2$ Similarly for the likelihood $$p(y|J) = \frac{1}{\sqrt{2N_0\pi}} e^{-\frac{1}{2N_0}[\|y\|^2_2 - q^H_{y,k}(J)e_{y,k}(J)]}$$

define $1_{y,k}(J) \triangleq \|\Pi_{\tilde{\Psi}_J} y\|^2_2$.

In reducing the calculation of the MMSE estimate the following two properties were relied on:
  i. The (near) orthogonality of clusters that allowed us to reduce calculations in a divide and conquer manner; and
  ii. Recursive implementation of the log-likelihood and a *posteriori* expectation. One more level of structure in $\Psi$ that can be exploited is that its columns are shifted versions of each other (up to some scalar). Mathematically, express this property as $\Psi^H_{(J+j)}\Psi_{(i+j)} = \sigma^2_j \Psi^H_J \Psi_i$ Where $\sigma^2_j$ is the quantity that results from the exponentially decaying profile of the UWB channel and is known a *priori* and the amount of shift or translation is j.

Translational invariance allows focus on the support of the form $J=\{i_1, i_2, i_3, \ldots, i_k\}$ in calculating $q_{\psi,k}(J)$, $e_{\psi,k}(J)$ and $f_J$. These values can then be used to deduce the related quantities for the shifted support (J+j). Translational invariance applies to intra-cluster as well as to cluster-to-cluster calculations. Thus, let $i_c$ denote the number of columns separating cluster 1 and cluster c. Then, $q_{\psi,k}(J+i_c)$, $e_{\psi,k}(J+i_c)$ and $f_{J+i_c}$, needed at cluster c can be easily deduced from their counterparts at cluster 1.

Figure 6:
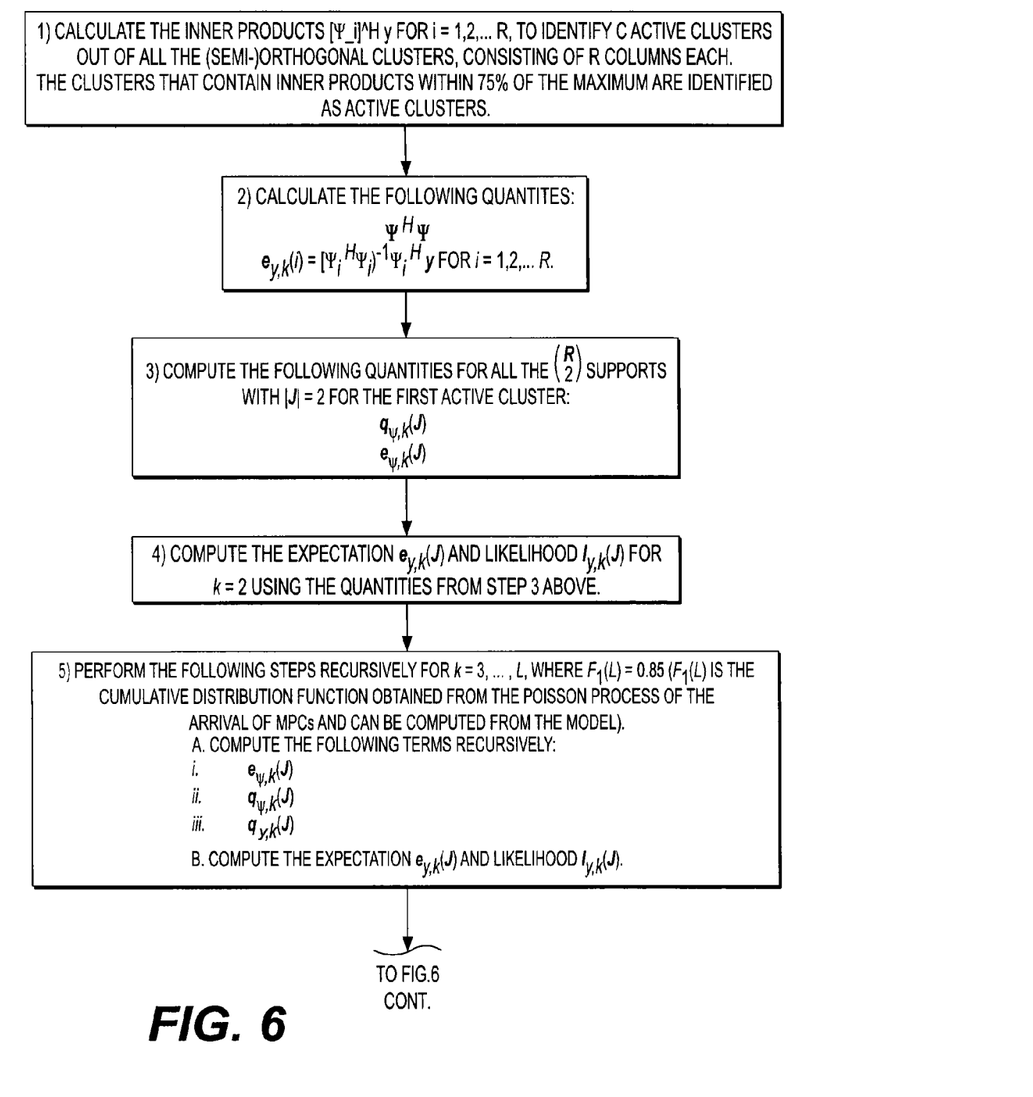
FIG. 6 shows the flow chart for Algorithm of low-complexity MMSE estimation.

Thus, by exploiting the rich underlying structure, all the intra-cluster metrics can be obtained in a computationally efficient manner. The algorithm in the disclosure is described in detail in the flow chart of FIG. 6.

The UWB channel response estimation steps of the disclosure can be implemented on a device such as a communications device.

Figure 7:
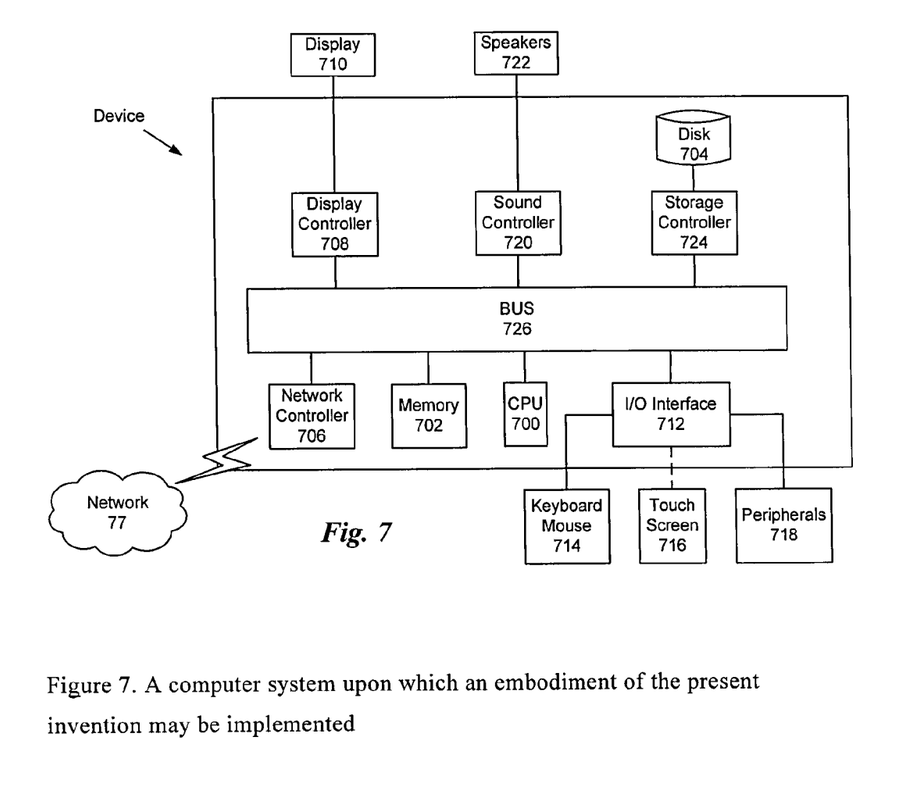
FIG. 7 shows a computer system upon which an embodiment of the present invention may be implemented.

Next, a hardware description of a device according to exemplary embodiments is described with reference to FIG. 7. In FIG. 7, the device includes a CPU 700 which performs the processes described above. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the device, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

In one embodiment the present disclosure differs from prior art in that it estimated UWB channel response irrespective of whether the transmission is carrier based or carrier free (baseband).

In another embodiment, the present disclosure differs from prior art by sensing matrix in the present disclosure being a banded matrix which is a sub-class of Toeplitz matrices and no eigenvalues matrices are generated which saves a lot of computational complexity compared to prior art.

In another embodiment, the present disclosure includes working as 'blind' estimation i.e., without the use of any training symbols.

In another embodiment, the present disclosure includes exploiting not only the sparsity of the channel but also the inherent structure in the sensing matrix. The present disclosure may incorporate a *priori* statistical information about a channel and carry out channel estimation with a Bayesian approach.

In another embodiment, the present includes carrying out all the channel estimation in the time domain in contrast with estimating the channel parameters in the frequency domain.

In another embodiment, the present disclosure includes incorporating a *priori* statistical information about the channel while performing the channel estimation in a Bayesian framework, as opposed to performing the estimation in two steps, wherein the first step the channel statistics and noise are estimated and in the second step the channel parameters are estimated as refinements.

In another embodiment, the present disclosure includes both Bayesian estimation framework and exploiting the sparsity of the channel and also the inherent structure in the sensing matrix, incorporating a *priori* statistical information about the channel.

In another embodiment the present disclosure includes by-passing the need to using any pre-filtering for estimation of UWB channels.

In another embodiment the present disclosure includes utilizing the structure in the channel to reduce the computational complexity of the algorithm.

In another embodiment the present disclosure includes carrying out the channel estimation on sub-Nyquist samples of the UWB signal and still achieving a low computational complexity, instead of working on symbol rate sampling and estimating channel at the full channel bandwidth.

The invention claimed is:

1. A method for estimating an impulse response h(t) of an impulse-radio ultra-wideband communication channel, comprising:
   sub-sampling, by circuitry, a received signal profile r(n) at a frequency less than a Nyquist frequency of the impulse-radio ultra-wideband communication channel to obtain a subsampled received signal profile y;
   identifying, by the circuitry and using an orthogonal-clustering method, a plurality of clusters ($\theta_1, \theta_2 \ldots \theta_c$) from column vectors of a sensing matrix $\Psi$ representing a sub-sampled transmit signal profile g and representing a priori channel statistics of the impulse-radio ultra-wideband communication channel;
   determining, by the circuitry, at least one active cluster having a correlation with the subsampled received signal profile y that is greater than a correlation of other clusters of the plurality of clusters with the subsampled received signal profile;
   determining, by the circuitry, a minimum mean square error (MMSE) estimate of the impulse-radio ultra-wideband communication channel by Bayesian estimation using the subsampled received signal profile y and using the plurality of clusters to obtain an optimal channel estimate â by using the at least one active cluster before the other clusters of the plurality of clusters, wherein
   the subsampled received signal profile y is the subsampled transmit signal profile g modified by the impulse response h(t) and noise of the impulse-radio ultra-wideband communication channel, and
   the impulse response $$h(t) = \sum_{l=0}^{L-1} a_l \delta(t - \tau_l)$$

of the impulse-radio ultra-wideband communication channel is expressed as a sum of a total number of L resolvable multipath components, each $l^{th}$ path including a real valued fading gain $a_l$, and a delay $\tau_l$, and $\delta(.)$ is a Dirac delta function; and
   outputting, by the circuitry, the optimal channel estimate â, thereby to exploit a structure of the sensing matrix $\Psi$ to more efficiently estimate the impulse response h(t) of the impulse-radio ultra-wideband communication channel.

2. The method of claim 1, wherein the sub-sampling of the received signal profile is performed in combination with the determining of the MMSE estimate by Bayesian estimation to estimate the real valued fading gain $a_l$ and delay $\tau_l$ of the $l^{th}$ path of the impulse-radio ultra-wideband communication channel.

3. The method of claim 1, further comprising:
   identifying clusters of the plurality of clusters according to a predefined orthogonality criterion to reduce computational complexity.

4. The method of claim 1, wherein the subsampled received signal profile y is correlated with each cluster of the plurality of clusters to limit calculation only to those clusters that have significant correlation with the subsampled received signal profile y.

5. The method of claim 1, wherein by identifying the plurality of clusters ($\theta_1, \theta_2 \ldots \theta_c$) in the subsampled received signal profile y, all calculations involved in determining MMSE estimate of channel are divided into a set of independent calculations.

6. The method of claim 1, further comprising:
   exploiting a Toeplitz structure and a banded diagonal structure of the sensing matrix $\Psi$ to reduce calculations involved in calculating a portion of the optimal channel estimate â corresponding to a cluster $\theta_c$ to obtain a non-zero portion of the optimal channel estimate â having support corresponding to a sub-space C of the vector space of the optimal channel estimate â and being denoted by $\hat{a}_c$.

7. The method of claim 1, wherein the determining of the MMSE estimate of the impulse-radio ultra-wideband communication channel further includes performing cluster-wise calculations and calculating, in an order-recursive manner, an a posteriori conditional expectation value of a channel estimate a conditioned on the subsampled received signal profile y, which is given by $$E(a|y) = \sum_{J \subset N} p(J|y) E(a_J | y, J),$$

wherein the quantity p(y|J) is a conditional a priori probability of the subsampled received signal profile y conditioned on a support set J, the quantity $E(a_J|y,J)$ is an a posteriori conditional expectation value of a non-zero part $a_J$ of the channel estimate a having support corresponding to the support set J and the expectation value is conditioned on the subsampled received signal profile y and the support set J, N is a search space consisting of all support sets of the sensing matrix Ψ, and the channel estimate a is given by an element-by-element dot product of a binary support vector $a_b$ of the channel estimate a and the non-zero part $a_J$ of the channel estimate a, which element-by-element dot product is given by $a = a_b \cdot a_J$.

8. The method of claim 7, wherein the determining of the MMSE estimate of the impulse-radio ultra-wideband communication channel is performed by calculating $$\hat{a} = \sum_{J \subset N} \frac{p(y|J)p(J)}{p(y)} E(a_J | y, J),$$

wherein an a priori probability of the support set is given by p(J).

9. The method of claim 8, wherein E(a |y,J) is estimated using a least squares estimate by projecting the subsampled received signal profile y onto an orthogonal complement of a subspace formed by a set of columns $\Psi_J$ of the sensing matrix Ψ corresponding to the support set J and obtaining a noise vector corresponding to the noise of the impulse-radio ultra-wideband communication channel.

10. The method of claim 9, wherein the determining of the MMSE estimate of the impulse-radio ultra-wideband communication channel further includes cluster-wise calculations performed in an order-recursive calculation of the a posteriori conditional expectation value of the non-zero portion $a_J$ of the channel estimate a corresponding to the support set given the subsampled received signal profile y that is denoted by $E(a_J|y)$, wherein
  a $k^{th}$ recursion of the order-recursive calculation of the a posteriori conditional expectation value, which is denoted by $e_{y,k}(J) \triangleq E(a_{J_k}|y)$, is calculated by $$e_{y,k}(J_k) = \begin{bmatrix} \frac{1}{f_{J_k}}(q_{\psi,k}^H(J_k)e_{y,k-1}(J_{k-1}) - \chi_{ik}e_{y,1}(i_k))e_{\psi,k}(J_k) + e_{y,k-1}(J_{k-1}) \\ \frac{1}{f_{J_k}}(q_{\psi,k}^H(J_k)e_{y,k-1}(J_{k-1}) - \chi_{ik}e_{y,1}(i_k)) \end{bmatrix},$$

k is a recursion index,
the support set $J_k$ is defined as $J_k = \{i_1, i_2, i_3, \ldots, i_k\}$ and $i_i$ corresponds to an $i^{th}$ vector of the support set $J_k$,
a sensing-matrix vector $_{\psi ik}$ is a column vector of the sensing matrix Ψ corresponding to the $i^{th}$ vector of the support set $J_k$, and
a matrix $\Psi_{J_k}$ is a sub-matrix of the sensing matrix Ψ corresponding to the support set $J_k$, $q_{\psi,k}(J) \triangleq \Psi_{J_{k-1}}^H \psi_{ik}$, $e_{\psi,k}(J_k) \triangleq \Psi_{J_k}[\Psi_{J_k}^H \Psi_{J_k}]^{-1} \Psi_{J_k}^H \psi_{ik}$, $f_{J_k} \triangleq \chi_{ik} - q_{\psi,k}^H(J_k)e_{\psi,k}(J_k)$, and $\chi_{ik} = \|\Psi_{ik}\|_2^2$.

11. The method of claim 10, further comprising:
identifying from among the clusters of the plurality of clusters the at least one active cluster having an inner product with the respective sensing-matrix vectors $\psi_{ik}$ within each active cluster that exceeds a predefined threshold; and
the cluster-wise calculations performed in an order-recursive calculation of the a posteriori conditional expectation value $E(a_J|y)$ are first performed using the at least one active cluster before performing the cluster-wise calculations of $E(a_J|y)$ using the clusters of the plurality of clusters that are not included in the at least one active cluster.

12. A receiving apparatus, comprising:
an interface configured to receive a received signal profile r(n); and
circuitry configured to
  sub-sample the received signal profile r(n) at a frequency less than a Nyquist frequency of an impulse-radio ultra-wideband communication channel to obtain a subsampled received signal profile y,
  identify, using an orthogonal-clustering method, a plurality of clusters $(\theta_1, \theta_2 \ldots \theta_c)$ from among column vectors of a sensing matrix Ψ representing a subsampled transmit signal profile g and a priori channel statistics of the impulse-radio ultra-wideband communication channel,
  determine at least one active cluster having a correlation with the subsampled received signal profile y that is greater than a correlation of other clusters of the plurality of clusters with the subsampled received signal profile;
  estimate, using Bayesian estimation, a minimum mean square error (MMSE) estimate of the impulse-radio ultra-wideband communication channel using the subsampled received signal profile y and using the plurality of clusters to obtain an optimal channel estimate â by using the at least one active cluster before the other clusters of the plurality of clusters, and
  output the optimal channel estimate â, thereby to exploit a structure of the sensing matrix Ψ to more efficiently estimate an impulse response h(t) of the impulse-radio ultra-wideband communication channel, wherein
the subsampled received signal profile y is the subsampled signal profile g modified by a channel response and noise of the impulse-radio ultra-wideband communication channel.

* * * * *